March 4, 1952     P. J. KINDSCHER     2,587,736
INTERCHANGEABLE FISH LURE
Filed Aug. 8, 1947
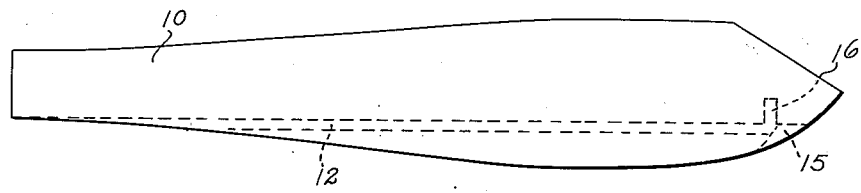
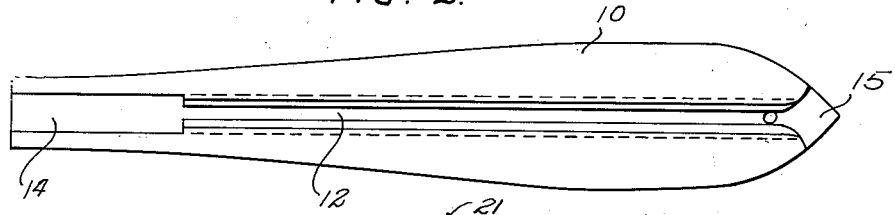
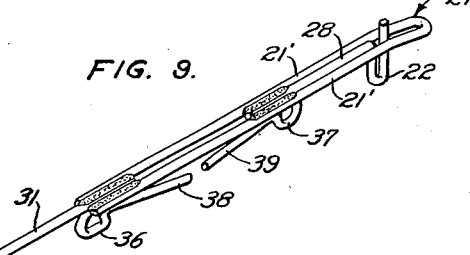
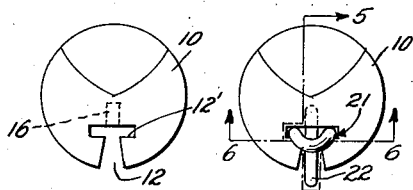
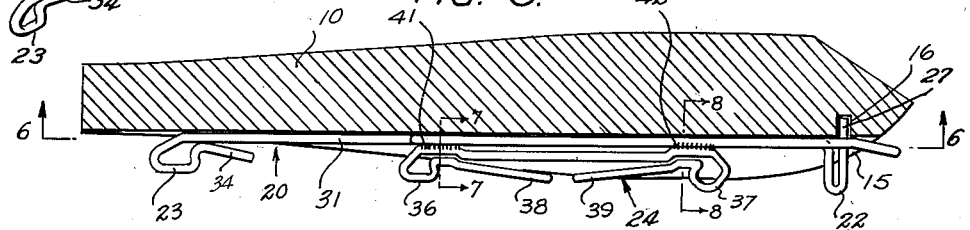
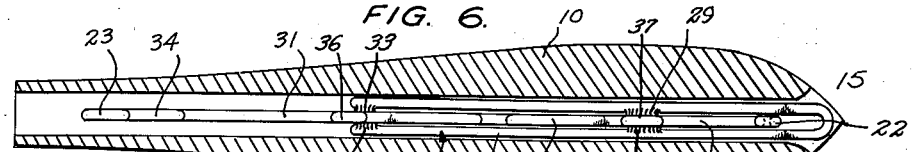
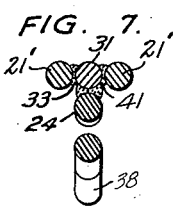
PAUL J. KINDSCHER,
Inventor
By McMorrow, Berman & Davidson
Attorneys Patented Mar. 4, 1952

2,587,736

UNITED STATES PATENT OFFICE 2,587,736

INTERCHANGEABLE FISH LURE

Paul J. Kindscher, Woodbridge, N. J.

Application August 8, 1947, Serial No. 767,489

2 Claims. (Cl. 43—42.36)

This invention relates to fish lures, and more particularly to a fish lure that has a demountable hook assembly.

Ordinary fish lures come complete with hooks, flippers and other fittings. Consequently, if a fisherman desires several fish lures of different shapes, sizes, or colors, he must acquire a complete unit of each size, shape, and color. In accordance with the principles of this invention, only one hook fitting need be required, and a series of lure bodies is provided, each of which is slotted to receive the hook fitting. As a result, the fisherman needs only on fitting assembly, and may have as many lure bodies as he desires, each of the lure bodies being adapted to receive the same fitting. The fitting is so constructed that it is spring pressed into the slot of the lure body, and it can be easily assembled or disassembled.

A preferred embodiment of the invention is illustrated in the accompanying drawings. It is understood, however, that changes may be made in the size, contour, and other details of the components illustrated, without departing from the spirit of the invention as hereinafter claimed.

Figure 1 is a side elevation of one form of lure body utilized in the present invention.

Figure 2 is a bottom view of the structure shown in Figure 1.

Figure 3 is a front elevation, taken from the right of Figure 1.

Figure 4 is a front elevation of a hook fitting adapted to cooperate with the lure body shown in Figures 1, 2, and 3.

Figure 5 is a longitudinal vertical section taken along the line 5—5 of Figure 4.

Figure 6 is a horizontal section taken on the line 6—6 of Figure 4.

Figure 7 is a vertical section, taken along the line 7—7 of Figure 5, but with the body removed.

Figure 8 is a vertical section, taken along the line 8—8 of Figure 5, but with the body removed.

Figure 9 is a perspective view of the fitting.

In Figures 1, 2, and 3 is shown a fish lure 10 of any desired shape, size or color. It may be made of plastic, wood, or any other suitable material, and may be hollow or solid. The underside of the body of the lure 10 is provided with a diverging T-shaped slot 12 extending horizontally of the lure 10. The construction of this slot 12 will be evident from an inspection of Figure 3 of the drawings. Slot 12 is cut away at the tail portion of the lure 10 to form a recess 14, for a purpose to be described more particularly hereinafter. The slot 12 also widens out at the nose portion of the lure 10 to form a pocket 15. Near the pocket 15 the slot 12 has an upward vertical offset 16. While the series of lures 10 may be of different sizes and configurations, the slot 12 of each one is similar.

A fitting, represented generally by the reference character 20, is adapted to be accommodated within the slot 12 of any one of the lures 10.

The fitting 20 comprises a sliding member 21, a forward locking member 22, a rear hook member 23, and a central hook member 24.

The sliding member 21 is U-shaped in plan, as indicated in Figure 6 of the drawings, the base or bight of the U projecting forwardly and slightly outwardly, and the legs or laterally extending side members 21' being adapted to fit within the outwardly extending lateral portions or cross arms 12' at the inner end of the slot 12. The locking member 22 is hook-shaped in elevation as indicated in Figure 5, the point 27 of the hook being adapted to be engaged within the offset 16 of the slot 12. The locking member 22 also includes a shank 28 that fits within the legs of the sliding member 21 and is welded thereto at 29.

The point of attachment of the locking member 22 to the slide member 21 is to the rear of the hook 27 at 29, so that the elasticity of the locking member 22 will permit it to be moved vertically to engage the offset 16 or to be disengaged therefrom.

The rear hook member 23 is adapted to extend below the body of the lure 10, and it has a horizontal shank 31 positioned between the rear portions of the legs of the U-shaped slide 21 and welded thereto at 33. The hook member 23 is designed to hold a fish hook or spoon and is provided with a catch 34 to retain the fish hook or spoon in position.

The hook member 24 comprises two hooks 36 and 37, the hook 36 including a forwardly projecting catch 38, and the hook 37 including a rearwardly projecting catch 39. The hook member 24 is also accommodated between the legs of the slide 21, and is welded thereto at 41 and 42, as indicated in Figure 5.

The components of the fitting 20 may be made of a spring wire.

In assembling the fitting 20 to the lure 10, it is only necessary to slide the fitting 20 forwardly from the recess 14 into the slot 12 until the hook 27 of the locking member 22 engages in the vertical offset 16 of the slot 12 in the nose of the lure 10. The fitting 20 may already be provided with the various fish hooks, spoons, lines, and other appurtenances or these may be attached to the fitting 20 after it is in place in the lure 10. The fish line, of course, is attached to the base of the U-shaped slide 21, at the nose of the lure 10.

If the fisherman desires to use a different lure 10, he merely pulls down the locking member 22 until the hook 27 thereof is disengaged from the offset 16 of the slot 12, and the fitting 20 may be pulled either forwardly or backwardly along the slot 12 until it is free of the lure 10.

It will be seen, therefore, that the operator need not have more than one fitting 20, and that he need not change his fish hook or spoons from one fitting 20 to another in attempting to catch different kinds of fish.

What is claimed is:

1. In combination, a lure provided with a longitudinally extending T-shaped slot, a fitting adapted to slide within the cross arm of said slot along the length thereof, said slot having an offset portion, said fitting having a projection adapted to be elastically held within the said offset to lock the fitting in place, means on said fitting for holding a fish hook, and means on said fitting for holding a fish line.

2. A fish lure comprising a body, a fitting positioned adjacent the under surface of said body and slidably supported in said body for insertion and withdrawal of one end of the latter, a spring actuable locking member arranged transversely of said fitting adjacent said one end and detachably engageable with the adjacent portion of said body for releasably locking said fitting to said body when completely inserted in the latter, a first hook member positioned longitudinally of said fitting adjacent the other end of said fitting and dependingly supported therefrom for attachment of a fish hook thereto, and a second hook member positioned longitudinally of said fitting and spaced from said locking member and said first hook member and dependingly secured to said fitting for attachment of a further fish hook, said second hook member embodying a pair of hooks arranged in longitudinal spaced relation with the open end of each facing each other.

PAUL J. KINDSCHER.

REFERENCES CITED

The following references are of record in the file of this patent:

UNITED STATES PATENTS

| Number | Name | Date |
| --- | --- | --- |
| 744,809 | Shepherd | Nov. 24, 1903 |
| 1,838,352 | Anderson | Dec. 29, 1931 |
| 2,147,444 | Kelly | Feb. 14, 1939 |
| 2,190,449 | Goldammer | Feb. 13, 1940 |
| 2,295,292 | Rogers | Sept. 8, 1942 |